United States Patent
Rathore et al.

(10) Patent No.: US 9,346,975 B2
(45) Date of Patent: May 24, 2016

(54) SILSESQUIOXANE-LIKE PARTICLES

(71) Applicant: 3M INNOVATIVE PROPERTIES COMPANY, St. Paul, MN (US)

(72) Inventors: Jitendra S. Rathore, Woodbury, MN (US); Karan Jindal, Woodbury, MN (US); Ambuj Sharma, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/410,332

(22) PCT Filed: Feb. 18, 2013

(86) PCT No.: PCT/US2013/026570
§ 371 (c)(1),
(2) Date: Dec. 22, 2014

(87) PCT Pub. No.: WO2014/003827
PCT Pub. Date: Jan. 3, 2014

(65) Prior Publication Data
US 2015/0322293 A1 Nov. 12, 2015

Related U.S. Application Data

(60) Provisional application No. 61/666,019, filed on Jun. 29, 2012.

(51) Int. Cl.
*C09D 183/00* (2006.01)
*C08L 83/04* (2006.01)
*C09D 183/04* (2006.01)
*C08G 77/12* (2006.01)

(52) U.S. Cl.
CPC .............. *C09D 183/00* (2013.01); *C08L 83/04* (2013.01); *C09D 183/04* (2013.01); *C08G 77/12* (2013.01)

(58) Field of Classification Search
CPC ..................................................... C08G 77/12
See application file for complete search history.

(56) References Cited

U.S. PATENT DOCUMENTS

| | | | |
|---|---|---|---|
| 2,715,060 A | 8/1955 | Barry | |
| 3,677,784 A | 7/1972 | Nitzsche | |
| 4,191,587 A | 3/1980 | Kratel | |
| 4,344,800 A | 8/1982 | Lutz | |
| 5,789,495 A | 8/1998 | Burns | |
| 6,403,689 B1 * | 6/2002 | Lehaut | C08K 3/22 106/287.1 |
| 7,718,264 B2 | 5/2010 | Klun | |
| 2002/0037936 A1 | 3/2002 | Michael | |
| 2008/0069753 A1 | 3/2008 | Floess | |
| 2008/0090010 A1 | 4/2008 | Zhang | |
| 2009/0226742 A1 | 9/2009 | Blum et al. | |
| 2009/0298982 A1 | 12/2009 | Meyer | |
| 2011/0000397 A1 | 1/2011 | Lortz | |

OTHER PUBLICATIONS

Arkhireeva, "Synthesis of sub-200 nm silsesquioxane particles using a modified Stober sol-gel route", J. Mater. Chem., 2003, vol. 13, pp. 3122-3127.
Arkhireeva, "Preparation of Silsesquioxanc Particles via a Nonhydrolylic Sol-Gel Route", Chemistry of Materials, Jan. 22, 2005, vol. 17, No. 4, pp. 875-880.
Blum, "Modifications of Hydrpsiloxane Polymers for Coating Applications", Surface Coatings International Part B: Coatings Transactions, Jan. 2001, vol. 84, No. B1, pp. 27-33.
Dodiuk, "Hydrophobic and Self-Cleaning Coatings", Polymers for Advanced Technologies, Sep. 2007, vol. 18, No. 9, pp. 746-750.
Mabry, "Hydrophobic Silsesquioxane Nanoparticles and Nanocomposite Surfaces", pp. 290-300 (2007).
International Search Report for PCT International Application No. PCT/US2013/026570 mailed on May 27, 2013, 5 pages.

* cited by examiner

*Primary Examiner* — Kuo-Liang Peng
(74) *Attorney, Agent, or Firm* — Julie Lapos-Kucher

(57) ABSTRACT

Described herein is a method of making silsesquioxane-like particles using polyhydrosiloxanes and a water soluble base. The silsesquioxane-like particles have an average particle diameter of less than 100 micrometers and are substantially free of —OH bonds. In one embodiment, the silsesquioxane-like particles may be used in films.

12 Claims, No Drawings

SILSESQUIOXANE-LIKE PARTICLES

CROSS REFERENCE TO RELATED APPLICATIONS

This application is a national stage filing under 35 U.S.C. 371 of PCT/US2013/026570, filed Feb. 18, 2013, which claims priority to U.S. Provisional Patent Application No. 61/666019, filed Jun. 29, 2012, the disclosures of which are incorporated by reference in their entirety herein.

TECHNICAL FIELD

A process for preparing silsesquioxane-like particles is described along with compositions and articles thereof.

BACKGROUND

Hydrophobic films and coatings, have garnered considerable attention in recent years due to a number of attractive qualities. Highly hydrophobic surfaces have been recognized in nature, perhaps most prevalently on lotus leaves and also on cicada wings. Because of its hydrophobic properties, the lotus leaf is capable of self-cleaning by the washing away of dust particles and debris as water droplets roll off its surface. This ability to self-clean is desirable in a number of modern-day applications.

To achieve these highly hydrophobic surfaces, hydrophobic particles have been added to the coatings and films to not only impart hydrophobicity, but also improve and/or enhance the mechanical properties of the coating or film.

One class of hydrophobic particles are hydrophobic silica or silica-like particles. Hydrophobic silica particles are generally prepared by first making silica particles either by pyrogenic or precipitation methods and then functionalizing the silica particles with appropriate hydrophobic groups, such as organosilicon or organohalogenosilane compounds. See for example, U.S. Pat. No. 3,677,784 (Nitzsche, et al.); U.S. Pat. No. 4,191,587 (Kratel et al.); and U.S. Pat. Publ. No. 2009/0298982 (Meyer et al.). Another method of making organically modified silica particles is disclosed by Arkhireeva et al. in *J. Mater Chem.*, 2003, 13, 3122-3127, which discloses the synthesis of silsesquioxane nanoparticles using a sol-gel process. In this synthesis, sodium silicate, used as a seed, is combined with organotrialkoxysilane precursors to form silsesquioxane nanoparticles.

SUMMARY

There is a desire to find an alternative method of making organic-silicon hybrid particles. In one embodiment, the method is a simple and/or cost effective alternative. There may also be a desire to have organic-silicon hybrid particles that have fewer —OH groups.

In one aspect, a composition comprising a plurality of silsesquioxane-like particles is described, wherein the particles are substantially free of —OH bonds, and wherein at least a portion of the plurality of silsesquioxane-like particles has an average particle diameter of less than 100 micrometers.

In one embodiment, the plurality of silsesquioxane-like particles of the present disclosure has an average particle diameter less than 100 nanometers.

In another aspect, a method of making a plurality of particles is described comprising: providing a solution, a water soluble base, and a polyhydrosiloxane; contacting the polyhydrosiloxane with the water soluble base in the presence of the biphasic solution.

In yet another aspect, a coating is described comprising a plurality of silsesquioxane-like particles, wherein the particles are substantially free of —OH bonds, and wherein at least a portion of the plurality of silsesquioxane-like particles has an average particle diameter of less than 100 micrometers.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B).

The present disclosure provides an elegant preparation of silsesquioxane-like particles, herein referred to interchangeably as the particles. Silsesquioxane is an organic and inorganic hybrid. Silsesquioxane is characterized by the general formula $RSiO_{3/2}$ where R represents an organic substituent. The silicon atoms are connected together through the oxygen atoms with the R groups connected to the silicon atoms. The Si—O groups provide the inorganic properties, while the R groups provide the organic properties.

The silsesquioxane-like particles of the present disclosure are derived from apolyhydrosiloxane and a water soluble base, which are contacted to form the particles of the present disclosure.

Polyhydrosiloxane is a polymer of the following formula:

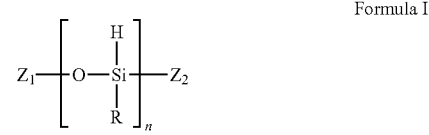

Formula I where $Z_1$ and $Z_2$ are endgroups; n is an integer greater than 2; and R is an organic group.

The endgroups of Formula I are derived from the starting materials used to make the polyhydrosiloxane. These endgroups are not particularly limited and can include, for example, an alkylated (linear, cyclic or branched) silane. Exemplary endgroups include: —Si(CH$_3$)$_3$, —Si(CH$_3$)$_2$H, —Si(CH$_3$)H$_2$, —Si(CH$_2$CH$_3$)$_3$, —Si(CH$_2$CH$_2$CH$_2$CH$_3$)$_3$, —Si(C(CH$_3$)$_3$)$_3$, —Si(CH$_2$CH(CH$_3$)CH$_3$)$_3$, and —Si(CH(CH$_3$)CH$_2$CH$_3$)$_3$.

The polyhydrosiloxane comprises repeating units, wherein n is at least 2, 4, 5, 6, 8, 10, 25, 50, 75, 100, 150, or even 200; and at most 1000, 2500, 5000, 7500, 10000, or even 15000.

R is an organic group, which may be linear or branched, cyclic or acyclic, saturated or unsaturated. The organic group can include as few as 1, 2, 3, 4, 5, 6, 7, 8, or even 9 carbon atoms and as many as 15, 17, 20, 25, 30, or even 35 carbon atoms. As used herein "organic group" refers to a carbon-based group that is connected via a carbon atom. In one embodiment, the organic group may contain functional group(s) such as amine, ammonium, ether, ester, or urethane groups.

In one embodiment, the organic group is not substituted. In one embodiment the organic group is an alkyl group. Exemplary alkyl groups include, methyl, ethyl, propyl, butyl, octyl, and phenyl.

In another embodiment, the organic group is substituted (i.e., the organic group comprises at least one atom besides carbon and hydrogen). In one embodiment, the substituted organic group comprises at least one caternary heteroatom (e.g., O, S, and/or N), and/or halogen (e.g., Cl, Br, and/or I). Exemplary organic groups include: methyl, ethyl, propyl, butyl, $C_6H_4Y$—, $C_6H_5(CH_2)$—, $C_6H_5(CH_2)$—, $C_6H_5(CHY)$—, and $C_6H_5(CY_2)$— where Y can be chloro, bromo, iodo, alkoxy, or a combination thereof, and allyl ($CH_2$=CH—$R^1$—) and vinyl ($CH_2$=$CR^1$—) groups, wherein $R^1$ is a linear or branched alkyl group.

Exemplary polyhydrosiloxanes include: polymethylhydrosiloxane, polyethylhydrosiloxane, polypropylhydrosiloxane, polybutylhydosiloxane, polybenzylhydrosiloxane, methylhydrogen cyclosiloxane, and combinations thereof.

The polyhydrosiloxanes may have a weight average molecular weight of at least 500, 1000, 1500, 1800, 2000, 2400, or even 2500 grams/mole; and at most 5000, 10000, 15000, 20000, 25000, 30000, or even 60000 grams/mole.

In the method of the present disclosure, the polyhydrosiloxane is contacted with a water soluble base. As used herein, a water soluble base has a solubility in water of more than 1, 10, 20, 30, 50, 75, 100 or even 200 g per 100 mL when measured at ambient conditions. Such water soluble bases include salts of silicates (e.g., sodium metasilicate, sodium orthosilicate, sodium trimethylsilanolate, lithium metasilicate, sodium hexafluorosilicate, and combinations thereof); hydroxyl bases (e.g., sodium hydroxide, ammonium hydroxide, calcium hydroxide, and lithium hydroxide); Lewis bases (e.g., $NH_3$, primary, secondary, and tertiary amines); pyridines; and combinations thereof.

In the present disclosure, the water soluble base is added at a mass ratio of water soluble base to polyhydrosiloxane of at least 1:0.1, 1:0.5, 1:1, 1:2, 1:3, 1:4, 1:5, 1:6, 1:8, 1:10, 1:15, 1:20, 1:25, 1:30, 1:40, 1:50, or even 1:75.

The polyhydrosiloxane and the water soluble base may be contacted in any known fashion. The polyhydrosiloxane may be contacted with the water soluble base in a batch-wise fashion or the polyhydrosiloxane may be continuously added (e.g., slowly added over a certain time period) to the water soluble base or vice versa. It is preferable to stir and/or agitate the reaction mixture when contacting and/or after contacting the polyhydrosiloxane and the water soluble base. Any suitable stirring or agitating method can be used to increase contact (and thus, the reaction kinetics) of the polyhydrosiloxane and the water soluble base.

Generally, it is ideal to have both the water soluble base and the polyhydrosiloxane in solution so that the reaction kinetics are improved. Because the polyhydrosiloxane is generally not water soluble, a polar organic solvent is used in the reaction mixture to provide the opportunity for the polyhydrosiloxane and the water soluble base to interact. Such solvents include acetone, methylethyl ketone, methyl isobutyl ketone, diethyl ethers, acetonitrile, tetrahydrofuran, ethyl acetate, 1,4-dioxane, and combinations thereof. In one embodiment, water is mixed with one or more polar organic solvents.

In one embodiment of the present disclosure, the reaction mixture consists essentially of the polyhydrosiloxane and the water soluble base in a solution. As used herein, consisting essentially of means that small amounts of other components may be present so long as silsesquioxane-like particles are generated having the desired properties (e.g., hydrophobicity, hardness, amount of —OH groups present, etc.).

In the present disclosure, the reaction comprising the polyhydrosiloxane and the aqueous base may be conducted at a temperature of at least 20, 25, 30, 40, 50, 60, 65, or even 70° C.; and at most 80, 100, 120, 150, 200, or even 250° C.

Although the reaction may be conducted at room temperature, it may be preferable to add heat to shorten the reaction time. Generally, the temperature of the reaction mixture should be controlled so as not to boil away the solution, inhibit the reaction kinetics, etc. Advantageously, in one embodiment, the temperatures used to make the particles of the present disclosure are lower than those used in making conventional hydrophobic silica particles.

The particles of the present disclosure are referred to as silsesquioxane-like since the particles comprise a branched network having the formula

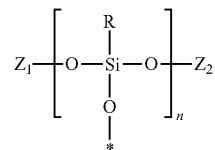

where R is an organic group, n is an integer of at least 3 (e.g., 3, 6, 9, 10, 20, 50, 100, etc.), and the oxygen atom at the * is bonded to another Si atom to form a three-dimensional branched network. $Z_1$ and $Z_2$ are endgroups, typically originating from the starting polyhydrosiloxane polymer used.

R can linear or branched, cyclic or acyclic, saturated or unsaturated, and substituted or unsubstituted, which originates from the starting polyhydrosiloxane used. In one embodiment the organic group is an alkyl group. Exemplary alkyl groups include, methyl, ethyl, propyl, butyl, octyl, and phenyl. In another embodiment, the organic group is substituted (i.e., the organic group comprises at least one atom besides carbon and hydrogen). In one embodiment, the substituted organic group comprises at least one caternary heteroatom (e.g., O, S, and/or N), and/or halogen (e.g., Cl, Br, and/or I). Exemplary organic groups include: methyl, ethyl, propyl, butyl, $C_6H_4Y$—, $C_6H_5(CH_2)$—, $C_6H_5(CH_2)$—, $C_6H_5(CHY)$—, and $C_6H_5(CY_2)$— where Y can be chloro, bromo, iodo, alkoxy, or a combination thereof, and allyl ($CH_2$=CH—$R^1$—) and vinyl ($CH_2$=$CR^1$—) groups, wherein $R^1$ is a linear or branched alkyl group.

The particles of the present disclosure have at least a segment corresponding to the general formula $RSiO_{3/2}$ where R represents an organic group and thus are referred to herein as silsesquioxane-like. However, the particles may comprise some endgroups and/or some Si—H groups, resulting from incomplete reaction of the starting material. Typically, at least 75%, 80%, 85%, 90%, 95, or even 99% of the branched network of the silsesquioxane-like particle comprises $RSiO_{312}$.

After making the particles, the reaction mixture can be filtered, washed, and/or dried to collect and/or purify the particles. The particles can be isolated from the reaction mixture prior to drying or may be dried directly from the reaction mixture. Any suitable method can be used for isolation (e.g., filtration or centrifugation).

In one embodiment, the reaction mixture comprising the silsesquioxane-like particles is dried to form a powder. The drying of the particles can be done in any suitable manner. For example, spray drying, lyophilization, exhaust oven drying, and/or solvent drying may be used. When drying in an oven, typically the drying temperature will be at least 40, 50, 70, 80 or even 90° C.; and at most 120, 140, 150, 180, or even 200° C.

The particles can be washed prior to or after isolation and/or drying. Washing the particles can be performed using a suitable washing solvent, such as water, a water-miscible organic solvent, a water immiscible organic solvent, or a mixture thereof. The washing solvent may be added to the reaction mixture and the resulting mixture suitably mixed, followed by filtration, centrifugation, or drying to isolate the washed particles. Alternatively, the particles can be isolated from the reaction mixture prior to washing. The washed particles can be further washed with additional washing steps followed by additional filtration, centrifugation, and/or drying steps.

Although not wanting to be bound by theory, it is believed that the reaction of the polyhydrosiloxane and the water soluble base in the reaction mixture is occurring at the interface between the hydrophobic polyhydrosiloxane and the water soluble base, resulting in the formation of the particles and their substantially spherical shape. As used herein, substantially spherical means that upon inspection of the particles of the present disclosure they are more or less spherical or elliptical in shape (i.e., does not have an edge or corner).

The particles of the present disclosure have a particle size which is dependent, at least in part, on the size (or length) of the polyhydrosiloxane polymer initially used. Generally the higher molecular weight of the polyhydrosiloxane, the larger the particles. Although not wanting to be limited by theory, it is also believed that the rate of agitation, temperature, and ratio of water soluble base to polyhydrosiloxane may also impact the particle size. The size of the particles can be determined by any suitable method, as is known in the art, such as dynamic light scattering or scanning electron microscopy.

The silsesquioxane-like particles of the present disclosure have an average diameter of less than or equal to 100 micrometers (μm), 50 μm, 25 μm, 10 μm, 1 μm, 100 nm (nanometer), or even 10 nm; and more than 0.5 nm, 1 nm, 2 nm, or even 5 nm.

In one embodiment, the individual particles formed are uniform in size, having a narrow size distribution. For example, 90% of the particles fall within 25, 20, 15, 10 or even 5% of the mean. Different batches of particles may be mixed together to generate bimodal or broader size distributions.

The silsesquioxane-like particles of the present disclosure are typically aggregated, meaning that the substantially spherical particles are bonded together to form aggregates. Typically, the particles are catenated, meaning bonded together to form a string of particles. It is believed that the particles are covalently bonded together through the reaction of a given polymer chain in two different distinct particles. Such aggregates may comprise at least two individual substantially spherical particles. In one embodiment, it is believed that this aggregation may lead to improved performance in some applications, such as in high strength composites.

For example, if the silsesquioxane-like particles of the present disclosure are an aggregation of primary nanoparticle-sized particles, then the maximum cross-sectional dimension of the aggregated particle is greater than 10 nm, 100 nm, 200 nm, 500 nm, or even 1000 nm.

In one embodiment, the silsesquioxane-like particles of the present disclosure have a high surface area. For example, at least 50, 200, 400 or even 500 m²/g; and at most 1000, 1200, 1400, 1500, or even 1800 m²/g based on BET (Brunaue Emmet Teller method) nitrogen adsorption.

In one embodiment the particles of the present disclosure are thermally stable meaning that they can be heated to temperatures of at least 120, 130, 140, 150, 160, 170, 180, or even 200° C.; and at most 250, 275, 300, 325, 350, 400, 500, 600, 700, or even 800° C. and achieve less than 15% weight loss.

In traditional preparations of hydrophobic silica or silica-like particles, silica particles are either used as a seed upon which to grow an outer hydrophobic layer or the outer surface is functionalized with compounds comprising a hydrophobic moiety. The process of the present disclosure does not start with premade particles, but instead is a one-step procedure to prepare the particles, which may be less expensive than current manufacturing methods of making hydrophobic silica-type particles.

As discussed above, by controlling the molecular weight of the polyhydrosiloxane, the rate of addition, temperature, etc., one can control the size of the particles obtained.

It is believed that the process as disclosed herein is a novel preparation of silsesquioxane. The silsesquioxane particles of the present disclosure have been found to be substantially free or even free of —OH. The amount of OH can be determined by titration of these groups or by Fourier Transform Infrared Spectroscopy (FTIR). As used herein, substantially free means that when analyzed by FTIR there is less than 2%, 1%, 0.5%, 0.2%, 0.1%, or even 0.5% of the OH groups present. The amount of OH can be calculated by determining the peak area from 3100 cm$^{-1}$ to 3600 cm$^{-1}$ and dividing it by the total peak area from 500 cm$^{-1}$ to 4000 cm$^{-1}$. Although not wanting to be bound by theory, it is believed that the water soluble base oxidizes the Si—H bond of the polyhydrosiloxane to form an Si—OH bond, which then reacts with another —Si—H moiety of the polyhydrosiloxane polymer to release hydrogen gas and form the silsesquioxane-like particles, thus leading to the particles being substantially free or even free of Si—OH bonds.

Because of the process used to make the particles of the present disclosure, the silsesquioxane-like particles described herein have a hardness of at least 0.5, 0.6, 0.7, 0.8, or even 0.9 GPa (gigaPascal); and at most 1.0, 1.1, 1.2, 1.3, 1.4, or even 1.5 GPa.

The particles of the present disclosure can be used for many different applications including for example, toner compositions, antiblocking agents, adhesion modifiers, polymer additives (e.g., for elastomers and rubbers, such as silicone rubbers), abrasion-resistant coatings and films, delustering coatings and films, reological control agents, and mechanical/optical control agents (e.g., for composites and plastics).

In one embodiment, the particles of the present disclosure may be used as fillers. For example, fillers for silicone rubbers, epoxies, etc.; high strength composites; and shock absorbing materials.

In one embodiment, the particles of the present disclosure may be used for acoustic dampening, as an antiblocking agent, or as an adhesion modifier.

In one embodiment, the particles of the present disclosure may be used for a film or a composite.

In one embodiment, the particles of the present disclosure may be used for a film or a coating. In one embodiment, the particles of the present disclosure may be mixed with a cross-linkable monomer and solvent to form a coating composition.

In one embodiment, the coating composition comprises at least 50 wt %, 60 wt %, 70 wt %, 80 wt %, or 90 wt % of one or more cross-linkable monomers such as multifunctional crosslinkable acrylates, urethanes, urethane acrylates, siloxanes, and epoxies. In some embodiments, cross-linkable monomers include mixtures of multifunctional acrylates, urethane acrylates, or epoxies.

In some embodiments, the acrylate is a free-radically polymerizable monomer(s) and/or oligomer(s) that can be photo-tcured once the coating composition has been coated. Useful multi-(meth) acrylate monomers and oligomers include: (a) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate; (b) tri(meth)acryl containing compounds such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl) isocyanurate triacrylate; (c) higher functionality (meth)acryl containing compounds such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate. Oligomeric(meth)acryl compounds such as, for example, urethane acrylates, polyester acrylates, and epoxy acrylates can also be employed Such (meth)acrylate compounds are widely available from vendors such as, for example, Sartomer Company of Exton, Pa.; UCB Chemicals Corporation of Smyrna, Ga.; and Aldrich Chemical Company of Milwaukee, Wis. As used herein, "(meth)acrylate" refers to compounds containing either an acrylate ($CH_2$=CHCOOR) or a methacrylate ($CH_2$=$CCH_3$COOR) structure or combinations thereof To facilitate curing, the coating compositions may further comprise at least one free-radical thermal initiator and/or photoinitiator. Typically, if such an initiator and/or photoinitiator are present, it comprises less than about 10 or even 5 percent by weight, of the coating composition, based on the total weight of the coating composition. Free-radical curing techniques are well known in the art and include, for example, thermal curing methods as well as radiation curing methods such as electron beam or ultraviolet radiation.

Useful free-radical thermal initiators include, for example, azo, peroxide, persulfate, and redox initiators, and combinations thereof. Useful free-radical photoinitiators include, for example, those known as useful in the UV cure of acrylate polymers such as described in U.S. Pat. No. 7,718,264 (Klun et al.).

The coating composition can be coated onto a substrate for make a coating or a film. The coating composition is dried to remove the solvent (e.g. heptanes, methyl isobutyl ketone, acetone, toluene, 1,3 dioxane, isopropanol, methyl ethyl ketone, tetrahydrofuran, etc.) and then cured for example by exposure to ultraviolet radiation (e.g. using an H-bulb or other lamp) at a desired wavelength, preferably in an inert atmosphere (less than 50 parts per million oxygen) or an electron beam. Alternatively, the coating composition may be coated onto a release liner or carrier web, at least partially cured, and subsequently removed from the release liner or carrier web, and optionally, further cured.

The compositions comprising the particles of the present disclosure can be applied as a single or multiple layer(s) directly to an article or film substrate using conventional film application techniques. Although it is usually convenient for the substrate to be in the form of a roll of continuous web, the coatings may be applied to individual sheets. Thin coating layers can be applied to a substrate using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others.

The coating compositions comprising the particles of the present disclosure can be applied to wide array of surfaces, as known in the coating and film art, to provide a hydrophobic surface. Such surfaces can be useful in antireflection, hard coat, optical, and/or easy-clean applications.

In one embodiment, the particles of the present disclosure may be used for hydrophobic coatings and films, wherein the coating/film has a contact angle for water greater than 90, 100, 125 or even 140°.

In one embodiment, the particles of the present disclosure may be used for super hydrophobic coatings and films, wherein the coating/film has a contact angle for water greater than 150°. In one embodiment, coatings/films comprising the silsesquioxane-like particles of the present disclosure will yield a hydrophobic coating that has a hardness of at least 0.05, 0.1, 0.5, 0.6, 0.7, 0.8, or even 0.9 GPa; and at most 1.0, 1.1, 1.2, 1.3, 1.4, or even 1.5 GPa.

Exemplary embodiments of the above disclosure are listed below:

Embodiment 1. A composition comprising: a plurality of silsesquioxane-like particles, wherein the particles are substantially free of —OH bonds, and wherein at least a portion of the plurality of silsesquioxane-like particles has an average particle diameter of less than 100 micrometers.

Embodiment 2. The composition of embodiment 1, wherein at least a portion of the plurality of silsesquioxane-like particles has an average particle diameter less than 100 nanometers.

Embodiment 3. The composition of any one of the previous embodiments, wherein at least a portion of the plurality of the silsesquioxane-like particles are substantially spherical.

Embodiment 4. The composition of any one of the previous embodiments, wherein the silsesquioxane-like particles have a hardness of greater than 1.5 GPa.

Embodiment 5. The composition of any one of the previous embodiments, wherein the silsesquioxane-like particles have a surface area of greater than 50 $m^2$/g.

Embodiment 6. The composition of any one of the previous embodiments, wherein the silsesquioxane-like particles of the plurality of silsesquioxane-like particles are catenated.

Embodiment 7. A film comprising the composition of any one of the previous embodiments.

Embodiment 8. The film of embodiment 7, wherein the film is hydrophobic.

Embodiment 9. The film of any one of embodiments 7-8, wherein the film has a hardness of at least 0.1 GPa.

Embodiment 10. The film of any one of embodiments 7-9, wherein the water contact angle is greater than 90° when measured using ASTM D5946-09 "Standard Test Method for Corona-Treated Polymer Films Using Water Contact Angle Measurements".

Embodiment 11. A composite comprising the composition of anyone of embodiments 1-6.

Embodiment 12. A method of making a plurality of particles comprising: providing a solution, a water soluble base, and a polyhydrosiloxane; and contacting the polyhydrosiloxane with the water soluble base in the presence of the solution.

Embodiment 13. The method of embodiment 12, further comprising adding heat when the polyhydosiloxane is contact with the water soluble base.

Embodiment 14. The method of any one of embodiments 12-13, wherein the polyhydrosiloxane is selected from: polymethylhydrosiloxane, polyethylhydrosiloxane, polypropylhydrosiloxane, polybutylhydosiloxane, polybenzylhydrosiloxane, methylhydrogen cyclosiloxane, and combinations thereof.

Embodiment 15. The method of any one of embodiments 12-14, wherein the solution is a polar organic solvent.

Embodiment 16. The method of embodiment 15, wherein the polar organic solvent is selected from at least one of: acetone, methyl ethyl ketone, methyl isobutyl ketone, diethyl ethers, acetonitrile, tetrahydrofuran, ethyl acetate, 1,4 dioxane, and combinations thereof.

Embodiment 17. The method of any one of embodiments 12-16, wherein the water soluble base is selected from a metal salt of silicates, hydroxyl bases, a Lewis bases, and combinations thereof.

Embodiment 18. The method of anyone of embodiments 12-17, wherein the ratio of water soluble base to polyhydrosiloxane is at least 1:0.5.

Embodiment 19. The method of any one of embodiments 12-18, wherein the molecular weight of the polyhydrosiloxane is at least 500 g/mol.

Embodiment 20. A composition comprising a particle, wherein the particle is derived from a water soluble base and a polyhydrosiloxane.

Embodiment 21. The composition of embodiment 20, wherein the water soluble base is selected from a metal salt of silicates, hydroxyl bases, a Lewis bases, and combinations thereof.

Embodiment 22. The composition of any one of embodiments 20-21, wherein the polyhydrosiloxane is a polymer of the following formula:

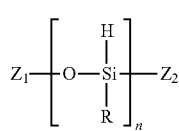

Formula I where $Z_1$ and $Z_2$ are endgroups; n is an integer greater than 2; and R is an organic group.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: cSt=centistokes, g=gram, m=meter, mol=mole; cm=centimeter, mm=millimeter, mL=milliliter, MPa=megaPascals, GPa=gigapascal and wt=weight.

Materials

"SYL-OFF 7048" is a 100 wt % solids hydrosilyl-functional polysiloxane crosslinker (said to comprise methylhydrogen cyclosiloxane), 30 cSt., obtained from Dow Corning Corporation, Midland, Mich., under the trade designation "SYL-OFF 7048 CROSSLINKER").

"HMS-991" is polymethylhydrosiloxane, trimethylsiloxy terminated polymer, viscosity 15-29 cSt, molecular weight of 1,400-1,800 g/mol, obtained from Gelest, Inc., Morrisville, Pa., under the trade designation "HMS-991".

"HMS-992" is polymethylhydrosiloxane, trimethylsiloxy terminated polymer, viscosity 24-30 cSt, molecular weight of 1,800-2,100 g/mol, obtained from Gelest, Inc., under the trade designation "HMS-992".

"HMS-993" is polymethylhydrosiloxane, trimethylsiloxy terminated polymer, viscosity 30-45 cSt, molecular weight of 2,100-2,400 g/mol, obtained from Gelest, Inc., under the trade designation "HMS-993".

Sodium metasilicate, sodium trimethylsilanolate, sodium hydroxide, and acetone were obtained from Sigma-Aldrich Chemical Company; Milwaukee, Wis. and used without further purification.

"SR-444" is pentaerythritol triacrylate, is a low volatile, fast curing monomer for use in free radical polymerization obtained from Sartomer USA, LLC., Exton, Pa. under trade designation "SR-444".

"IRGACURE 184" is 1-hydroxy-cyclohexyl-phenyl-ketone, is a non-yellowing photo-initiator obtained from BASF, Florham Park, N.J. under the trade designation "IRGACURE 184".

Test Methods

Average BET (Brunaue Emmet Teller Method) Surface Area

The average surface area of the particles was a five point multipoint analysis was run using nitrogen gas in helium for partial pressures of 0.1-0.3. About 0.1-0.2 g of sample was place in a large bulb 6 mm diameter stem sample cell. The samples were outgassed at 300° C. for two hours prior to analysis. The sample cell was weighed again and the sample run using a five point multipoint BET analysis with nitrogen gas in helium for partial pressures of 0.1-0.3.

Average Particle Size

A sample of silsesquioxane-like particles was mounted on an aluminum stub using double coated tape having conductive adhesive. Particles not adhered to the tape were removed using canned air. The stub was sputter coated with gold/palladium and the specimens were imaged at 3 kV using SEM (Hitachi S-4500 Field Emission Scanning Electron Microscope, Hitachi High Technologies America, Inc., Pleasanton, Calif.). Approximately 50 to 100 individual, distinct particles were manually identified and measured using the SEM imaging software to determine the particle size. The particle size reported is the average of the 50 to 100 particles measured.

% OH Present

The amount of OH present in the particles was determined as follows. Around 1.0 g mixture of the silsesquioxane-like particles and dried potassium bromide (1:99 wt ratio) was very finely ground using a mortar and pestle. The mixture was pressed between two potassium bromide disks and analyzed directly by Fourier Transform Infrared Spectroscopy or FTIR (Nicolet 6700 FTIR, Thermo Fisher Scientific, Madison, Wis.). Using integration software, "OMNIC" software version 7.3 from Thermo Fisher Scientific, the total peak area from 500 cm$^{-1}$ to 4000 cm$^{-1}$ was calculated along with the area of the —OH absorbance peak from 3100 to 3600 cm$^{-1}$. The % OH was calculated by taking area of the —OH absorbance peak versus the total peak area.

Example 1

Sodium metasilicate pentahydrate (12.2 g) was dissolved in a 250 g solution of deionized water/acetone (50:50 wt ratio)

in a 2000 mL flask at 65° C. SYL-OFF 7048 (30.0 g) was added drop-wise to the flask with stirring. Evolution of gas with concomitant generation of froth and white precipitate was observed. After the complete addition of the SYL-OFF 7048, the reaction mixture was maintained at 65° C. and stirred for 2 hours with addition of acetone (20 mL, after about 15 minutes). After 2 hours, the stirring was stopped and the reaction mixture was filtered. The white residue (silsesquioxane-like nanoparticles) was washed thoroughly with an excess of deionized water. Drying of the solid was performed in an exhaust oven at 150° C. for 4 hours. The properties of the resulting product are summarized in Table 1, below.

Example 2

Sodium metasilicate pentahydrate (12.2 g) was dissolved in 250 g of deionized water/acetone (50:50 wt. ratio) mixture in 2000 mL flask at 75° C. followed by the drop wise addition of SYL-OFF 7048 (30.0 g). Evolution of gas with concomitant generation of froth and white precipitate was observed during the stirring. After the complete addition of the SYL-OFF 7048, the reaction mixture was maintained at 75° C. and stirred for 2 hours with addition of acetone (20 mL, after about 15 minutes). After 2 hours, the stirring was stopped and the reaction mixture was filtered. The white residue (silsesquioxane-like nanoparticles) was washed thoroughly with excess of deionized water. Drying of the solid was performed in an exhaust oven at 150° C. for 4 hours. The properties of the resulting product are summarized in Table 1, below.

Example 3

Sodium hydroxide (5 g) was dissolved in 250 g of deionized water/acetone (50:50 wt. ratio) mixture in 2000 mL flask at 65° C. followed by the drop wise addition of SYL-OFF 7048 (30.0 g). Evolution of gas with concomitant generation of froth and white precipitate was observed during the stirring. After the complete addition of the SYL-OFF 7048, the reaction mixture was maintained at 65° C. and stirred for 2 hour with addition of acetone (20 mL, after about 15 minutes). After 2 hours, the stirring was stopped and the reaction mixture was filtered. The white residue (silsesquioxane-like nanoparticles) was washed thoroughly with excess of deionized water. Drying of the solid was performed in an exhaust oven at 150° C. for 4 hours. The properties of the resulting product are summarized in Table 1, below.

Example 4

Sodium trimethylsilanolate (10 g) was dissolved in 250 g of deionized water/acetone (50:50 wt. ratio) mixture in 2000 mL flask at 75° C. followed by the drop wise addition of SYL-OFF 7048 (40.0 g). Evolution of gas with concomitant generation of froth and white precipitate was observed during the stirring. After the complete addition of the SYL-OFF 7048, the reaction mixture was maintained at 75° C. and stirred for 2 hour with addition of acetone (20 mL, after about 15 minutes). After 2 hours, the stirring was stopped and the reaction mixture was filtered. The white residue (silsesquioxane-like nanoparticles) was washed thoroughly with excess of deionized water. Drying of the solid was performed in an exhaust oven at 150° C. for 4 hours. The properties of the resulting product are summarized in Table 1, below.

Example 5

Sodium metasilicate pentahydrate (12.2 g) was dissolved in 250 g of deionized water/acetone (50:50 wt. ratio) mixture in 2000 mL flask at 65° C. followed by the drop wise addition of HMS-991 (30.0 g). Evolution of gas with concomitant generation of froth and white precipitate was observed during the stirring. After the complete addition of the HMS-991, the reaction mixture was maintained at 65° C. and stirred for 2 hour with addition of acetone (20 mL, after about 15 minutes). After 2 hours, the stirring was stopped and the reaction mixture was filtered. The white residue (silsesquioxane-like nanoparticles) was washed thoroughly with excess of deionized water. Drying of the solid was performed in an exhaust oven at 150° C. for 4 hours. The properties of the resulting product are summarized in Table 1, below.

Example 6

Sodium hydroxide (5 g) was dissolved in 250 g of deionized water/acetone (50:50 wt. ratio) mixture in 2000 mL flask at 65° C. followed by the drop wise addition of HMS-991 (30.0 g). Evolution of gas with concomitant generation of froth and white precipitate was observed during the stirring. After the complete addition of the HMS-991, the reaction mixture was maintained at 65° C. and stirred for 2 hour with addition of acetone (20 mL, after about 15 minutes). After 2 hours, the stirring was stopped and the reaction mixture was filtered. The white residue (silsesquioxane-like nanoparticles) was washed thoroughly with excess of deionized water. Drying of the solid was performed in an exhaust oven at 150° C. for 4 hours. The properties of the resulting product are summarized in Table 1, below.

Example 7

Sodium metasilicate pentahydrate (12.2 g) was dissolved in 250 g of deionized water/acetone (50:50 wt. ratio) mixture in 2000 mL flask at 65° C. followed by the drop wise addition of HMS-992 (30.0 g). Evolution of gas with concomitant generation of froth and white precipitate was observed during the stirring. After the complete addition of the HMS-992, the reaction mixture was maintained at 65° C. and stirred for 2 hours with addition of acetone (20 mL, after about 15 minutes). After 2 hours, the stirring was stopped and the reaction mixture was filtered. The white residue (silsesquioxane-like nanoparticles) was washed thoroughly with excess of deionized water. Drying of the solid was performed in an exhaust oven at 150° C. for 4 hours. The properties of the resulting product are summarized in Table 1, below.

Example 8

Sodium hydroxide (5 g) was dissolved in 250 g of deionized water/acetone (50:50 wt. ratio) mixture in 2000 mL flask at 65° C. followed by the drop wise addition of HMS-992 (30.0 g). Evolution of gas with concomitant generation of froth and white precipitate was observed during the stirring. After the complete addition of the HMS-992, the reaction mixture was maintained at 65° C. and stirred for 2 hour with addition of acetone (20 mL, after about 15 minutes). After 2 hours, the stirring was stopped and the reaction mixture was filtered. The white residue (silsesquioxane-like nanoparticles) was washed thoroughly with excess of deionized water. Drying of the solid was performed in an exhaust oven at 150° C. for 4 hours. The properties of the resulting product are summarized in Table 1, below.

Example 9

Sodium metasilicate pentahydrate (12.2 g) was dissolved in 250 g of deionized water/acetone (50:50 wt. ratio) mixture in 2000 mL flask at 65° C. followed by the drop wise addition of HMS-993 (30.0 g). Evolution of gas with concomitant generation of froth and white precipitate was observed during the stirring. After the complete addition of the HMS-993, the reaction mixture was maintained at 65° C. and stirred for 2 hour with addition of acetone (20 mL, after about 15 minutes). After 2 hours, the stirring was stopped and the reaction mixture was filtered. The white residue (silsesquioxane-like nanoparticles) was washed thoroughly with excess of deionized water. Drying of the solid was performed in an exhaust oven at 150° C. for 4 hours. The properties of the resulting product are summarized in Table 1, below.

Example 10

Sodium hydroxide (5 g) was dissolved in 250 g of deionized water/acetone (50:50 wt. ratio) mixture in 2000 mL flask at 65° C. followed by the drop wise addition of HMS-993 (30.0 g). Evolution of gas with concomitant generation of froth and white precipitate was observed during the stirring. After the complete addition of the HMS-993, the reaction mixture was maintained at 65° C. and stirred for 2 hour with addition of acetone (20 mL, after about 15 minutes). After 2 hours, the stirring was stopped and the reaction mixture was filtered. The white residue (silsesquioxane-like nanoparticles) was washed thoroughly with excess of deionized water. Drying of the solid was performed in an exhaust oven at 150° C. for 4 hours. The properties of the resulting product are summarized in Table 1, below.

Example 11

Sodium metasilicate pentahydrate (5 g) was dissolved in 250 g of deionized water/acetone (50:50 wt. ratio) mixture in 2000 mL flask at 65° C. followed by the addition of SYL-OFF 7048 (20.0 g). Rapid evolution of the gas with concomitant generation of froth and white precipitate was observed during the stirring. The reaction mixture was maintained at 65° C. and stirred for 30 minutes. After 2 hours, the stirring was stopped and the reaction mixture was filtered. The white residue (silsesquioxane-like nanoparticles) was washed thoroughly with excess of deionized water. Drying of the solid was performed in an exhaust oven at 150° C. for 4 hours. The properties of the resulting product are summarized in Table 1, below.

TABLE 1

| Example | Yield (%) | Average BET Surface Area (m²/g) | Average Particle Size (nm) | % OH present |
|---|---|---|---|---|
| 1 | ≥90 | 94.2 | 50 | 0.1 |
| 2 | ≥90 | 98.9 | 48 | 0.1 |
| 3 | ≥90 | 70 | 60 | 0.09 |
| 4 | ≥90 | N/M | N/M | N/M |
| 5 | ≥90 | N/M | 60 | N/M |
| 6 | ≥90 | N/M | N/M | N/M |
| 7 | ≥90 | N/M | 80 | N/M |
| 8 | ≥90 | N/M | N/M | N/M |
| 9 | ≥90 | N/M | 110 | N/M |
| 10 | ≥90 | N/M | N/M | N/M |
| 11 | ≥90 | 110 | 40 | 0.1 |

N/M = not measured

Examples 12-15

Silsesquioxane-like particles from Example 1 were milled using a cylindrical ceramic milling media and tumbling for at least 24 hours. The milled silsesquioxane-like particles were mixed with toluene to form a dispersion comprising 15 wt % of the particles. The dispersion was mixed with "SR-444" and "IRGACURE 184" in the amount shown in Table 2 below to form a coating solution. The resulting coating solution was coated using a draw down blade coater on glass plates (15.4 cm×15.4 cm). The coatings were subsequently dried at 90° C. for 2 minutes and then cured by passing the coating at a speed of 11 meters/minute, two times, through a ultraviolet (UV) chamber (obtained from Fusion UV Systems, Inc. Gaithersburg, ML, under the trade designation "LIGHT HAMMER 6") equipped with an H-bulb (located 5.3 cm above the coated film, obtained from Fusion UV Systems, Inc.). Various heights of the drawn-down blade were used during coating. Shown in Table 2 below is the estimated dried coating thickness for the various examples.

The water contact angle for each coating sample was measured following a similar procedure as disclosed in ASTM D5946-09 "Standard Test Method for Corona-Treated Polymer Films Using Water Contact Angle Measurements". The results are shown in Table 2.

TABLE 2

| | Amount used (% wt*) | | Coating thickness | Water contact angle |
|---|---|---|---|---|
| Example | SR-444 | IRGACURE 184 | (micrometers) | (degrees) |
| 12 | 25 | 0.75 | 4 | 126.3 |
| 13 | 27 | 0.81 | 10 | 127.2 |
| 14 | 33 | 1 | 2 | 124.9 |
| 15 | 50 | 1.5 | 10 | 127.2 |

*The weight % are given relative to the weight of the total composition.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A composition comprising a particle, wherein the particle is derived from an aqueous solution comprising a water soluble base, and a polyhydrosiloxane.

2. The composition of claim 1, wherein the polyhydrosiloxane is selected from: polymethylhydrosiloxane, polyethylhydrosiloxane, polypropylhydrosiloxane, polybutylhydrosiloxane, polybenzylhydrosiloxane, methylhydrogen cyclosiloxane, and combinations thereof.

3. The composition of claim 1, wherein the aqueous solution comprises a polar organic solvent and water.

4. The composition of claim 1, wherein the polyhydrosiloxane is of the formula

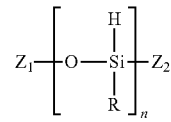

where $Z_1$ and $Z_2$ are endgroups; n is an integer greater than 2; and R is an organic group.

5. The composition of claim 4, wherein R is an alkyl group.

6. The composition of claim 5, wherein the alkyl group comprises at least one of methyl, ethyl, propyl, butyl, octyl, and phenyl.

7. The composition of claim 5, wherein R comprises at least one halogen.

8. The composition of claim 5, wherein R comprises at least one catenary heteroatom.

9. The composition of claim 1, wherein the particle is substantially free of —OH bonds, meaning that when analyzed by FTIR, the peak area from 3100-3600 cm$^{-1}$ divided by the total peak area from 500-4000 cm$^{-1}$ has a ratio less than 2%.

10. A film comprising the composition of claim 1.

11. The film of claim 10, wherein the film is hydrophobic.

12. A composite comprising the composition of claim 1.

* * * * *